Oct. 30, 1928.

J. T. WELCH

ARTIFICIAL BAIT

Filed May 29, 1925

1,689,541

Inventor
Jack T. Welch
by
Attys

Patented Oct. 30, 1928.

1,689,541

UNITED STATES PATENT OFFICE.

JACK T. WELCH, OF DOWAGIAC, MICHIGAN, ASSIGNOR TO JAMES HEDDON'S SONS, OF DOWAGIAC, MICHIGAN, A CORPORATION OF MICHIGAN.

ARTIFICIAL BAIT.

Application filed May 29, 1926. Serial No. 112,583.

This invention relates to the construction of fish baits, preferably in a form which combines in itself the desirable features of a wooden minnow bait with special features in imitation of a live frog, and the object of the present invention is to make provision for the molding or casting of such a bait from a composition of materials such as ground cork or the like, which will afford the necessary buoyancy, and, at the same time, make provision for an interior skeleton which will reinforce the more fragile extremities of the bait, and make provision for attachment of the hook and line tie in such a way as to relieve the composition of which the bait is composed from the strain occasioned in use by the hooking of a fish.

The invention is also directed to the means provided for so distributing the weight of the skeleton that it will serve to shift the center of mass to the rear of the center of buoyancy, with the result that when the bait is resting in the water, the rear or leg portion thereof will assume a downwardly hanging position in simulation of the resting position of a live frog.

Further objects and details will appear from a description of the invention in connection with the accompanying drawings wherein—

Figure 1:
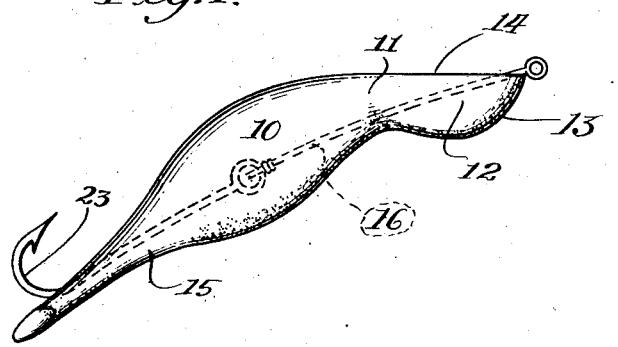
Figure 1 is a side elevation of the bait of the present invention showing the position assumed when at rest.

The bait comprises a body portion 10 which is of generally pear shaped formation tapering at its forward end and merging into a neck 11, which unites the body with a head 12 which is rounded on its under surface 13 and flattened on its front portion 14 to present a plain obliquely disposed surface for impingement against the water when the bait is being retrieved and occupies a substantially horizontal position in the water. This causes the water to stream past the sides of the neck, which creates a condition of unstable equilibrium, causing the bait to dart from side to side and otherwise move in simulation of the movements of a swimming frog. The body at its rear or enlarged end terminates in a pair of separated legs 15 resembling in outline the legs of a frog.

The present invention is concerned more particularly with the construction and arrangement of a bait having the foregoing features of configuration. The bait as a whole is constructed of some plastic composition which may be readily molded, and which when set or hardened, will afford a sufficiently firm and compact surface to receive the enameled finishing coats customarily applied to wooden baits.

A composition of cork is preferred for the construction of the present bait, since such composition possesses the buoyant properties which it is preferred to impart to the bait of the present invention, although other compositions may be employed, and it is not intended, unless otherwise specified, to limit the invention to a buoyant bait, or one necessarily having the configuration of a frog, since the skeletal features of the invention are applicable to baits of various configurations.

Figure 2:
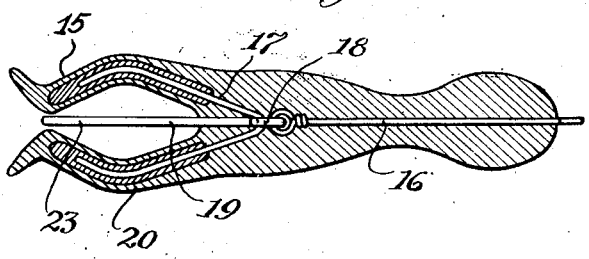
Fig. 2 is a sectional plan view illustrating the skeleton of the present bait.
Figure 3:
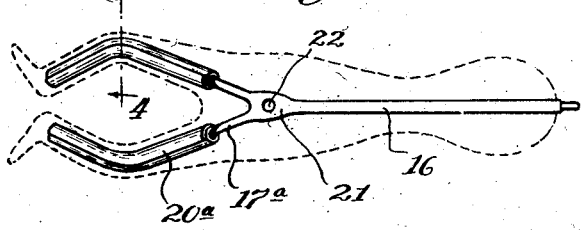
Fig. 3 is a modified arrangement of the skeleton.
Figure 4:
Fig. 4 is a cross sectional detail taken on line 4—4 of Fig. 3.

The body and leg portions of the present bait are molded upon a skeleton which comprises a longitudinally extending back-bone portion 16 which may be constructed of wire, as in Fig. 2, or may be stamped from sheet metal as in Fig. 3. The back-bone portion of the skeleton is connected at its rear end with diverging leg reinforcements 17, which, as shown in Fig. 2, are united to the back-bone portion by being looped through the eye 18 of a hook 19, although the leg portions may be formed integrally with the back-bone portion, as indicated by 17$^a$ in Fig. 3.

As shown in Fig. 2, the leg portions 17 are embedded within a sheath like covering 20 of lead or the like which serves to weight the rear or leg portion of the bait, although, if desired, the weight may be provided for, as in Fig. 3, by rolling up the metal composing the leg portions to afford several turns or layers 20$^a$ thereof, which will likewise tend to weight the leg portions to the degree necessary to cause the bait when resting in the water to assume the oblique position indicated in Fig. 1.

Where the skeleton is formed, as in Fig. 3, the leg portions and back-bone portions may be united by an integrally formed connecting portion 21, which is preferably provided with an aperture 22 through which the forward end of the hook may be entered. The precise method of forming and uniting the skeleton is subject to more or less variation, and the illustrations given are intended to indicate two appropriate methods of constructing this feature, although other methods might be utilized without departing from the spirit of the invention.

The hook 19 extends rearwardly between the legs of the bait and is upturned at its barbed end 23, which arrangement is desirable in that the legs will serve to guard the hook in considerable measure against fouling, and the arrangement is one which renders the presence of the hook relatively inconspicuous, and the hook itself assists in weighting the rear end of the bait, which is desirable for reasons previously stated. However, it is not intended, unless otherwise indicated, to limit the invention to one embodying the hook arrangement shown, since the skeleton of the present bait will serve as an attachment for hooks otherwise disposed.

The skeletal formation of the present bait is of particular advantage in connection with a bait configured to simulate a frog, in that it prevents the legs from being readily broken off or displaced, and, at the same time, affords a highly desirable method of weighting the bait to the desired degree, and by constructing and weighting the skeleton as a unit in the process of manufacture, it can be laid into the mold and embedded in the ground cork or other plastic composition which will completely embed the skeleton and hook during the molding operation.

I claim:

1. A fish bait comprising a body of buoyant plastic material terminating at its rear end in separated legs in simulation of a frog, a connected skeleton comprising a back-bone portion extending longitudinally through the body and terminating at its forward end in a line tie and terminating at its rear end with diverging skeletal leg portions embedded within the legs, said leg portions being weighted to cause the rear end of the bait to sink downwardly when at rest, and a hook lying between the legs and upturned at its barbed end, and having its shank entered through the rear end of the body and connected with the skeleton, substantially as described.

2. A fish bait comprising a body portion of generally pear shaped configuration terminating at its forward end in an upturned head connected to the body by a neck of reduced diameter, and the body terminating at its rear end in a pair of separated legs in simulation of a frog's legs, the body, head and legs being formed of a buoyant plastic composition, a skeleton embedded within the bait and comprising a longitudinally extending back-bone portion terminating at its forward end in a line tie located at the head of the bait and terminating at its rear portion in a pair of diverging leg portions weighted to increase the mass at the rear end of the bait and embedded within the leg portion, and a hook lying between the legs and having its barbed end turned upwardly and its forward end entered into the body and connected to the skeleton at the point of juncture between the back-bone and leg portions thereof, substantially as described.

JACK T. WELCH.